United States Patent
Krasnaberski

(10) Patent No.: US 11,067,815 B2
(45) Date of Patent: Jul. 20, 2021

(54) APPARATUS FOR BEAM SHAPING OF LASER RADIATION

(71) Applicant: LIMO GmbH, Dortmund (DE)

(72) Inventor: Aliaksei Krasnaberski, Dortmund (DE)

(73) Assignee: LIMO GmbH, Dortmund (DE)

( * ) Notice: Subject to any disclaimer, the term of this patent is extended or adjusted under 35 U.S.C. 154(b) by 373 days.

(21) Appl. No.: 16/034,867

(22) Filed: Jul. 13, 2018

(65) Prior Publication Data

US 2019/0018251 A1    Jan. 17, 2019

(30) Foreign Application Priority Data

Jul. 13, 2017   (DE) .......................... 102017115805.7

(51) Int. Cl.
    *G02B 27/12*    (2006.01)
    *G02B 27/09*    (2006.01)
    (Continued)

(52) U.S. Cl.
    CPC ...... *G02B 27/0927* (2013.01); *B23K 26/0624* (2015.10); *G02B 19/0052* (2013.01); *G02B 27/095* (2013.01)

(58) Field of Classification Search
    CPC .. G02B 27/09; G02B 27/0927; G02B 27/095; G02B 27/0955; G02B 27/0961; G02B 19/0014; G02B 19/0047; G02B 19/0057; G02B 19/0052; G02B 19/0061; G02B 13/18; H01S 3/0007; H01S 3/005; B23K 26/02; B23K 26/06; B23K 26/062; B23K 26/0622; B23K 26/0624

(Continued)

(56) References Cited

U.S. PATENT DOCUMENTS 6,487,022 B1    11/2002    Okorogu
8,023,206 B2    9/2011    Laskin
(Continued)

FOREIGN PATENT DOCUMENTS

EP    1998215 A1    12/2008

OTHER PUBLICATIONS

Gomez. C.G., "Laser Beam Shaping," Mater's Thesis, Faculty of Electrical Engineering and Communications Department of Radio Electronics, Jun. 2012.
(Continued)

*Primary Examiner* — William Choi
(74) *Attorney, Agent, or Firm* — Edell, Shapiro & Finnan, LLC.

(57) ABSTRACT

An apparatus for beam shaping of laser radiation in the form of ultra short pulses includes an achromatic optical device comprising a first substrate having a first Abbe number and a second substrate connected to the first substrate and having a second Abbe number that is different from the first Abbe number. The first and second substrates are arranged to allow the laser radiation to at least partially pass through the first and second substrates in succession, wherein an optically functional transformation boundary surface is disposed on one of the first and second substrates. The optically functional transformation boundary surface allows the laser radiation to pass at least partially, such that a profile of the laser radiation is transformed into a top-hat profile.

20 Claims, 1 Drawing Sheet

(51) Int. Cl.
  *B23K 26/0622* (2014.01)
  *G02B 19/00* (2006.01)
(58) Field of Classification Search
  USPC ....... 359/639, 641, 642, 708, 717, 754, 793,
      359/795; 372/101; 362/257, 268, 317,
      362/326, 335
  See application file for complete search history.

(56) References Cited

U.S. PATENT DOCUMENTS

| | | | | |
|---|---|---|---|---|
| 2003/0231536 | A1* | 12/2003 | Mizuno | G11B 7/1275 365/200 |
| 2004/0264007 | A1 | 12/2004 | Hoffnagle et al. | |
| 2007/0242327 | A1 | 10/2007 | Powell et al. | |
| 2010/0208356 | A1 | 8/2010 | Cayer | |
| 2011/0019292 | A1* | 1/2011 | Laskin | G02B 27/0927 359/793 |

OTHER PUBLICATIONS

Jefferson, C.M., and John A. Hoffnagle, "An Achromatic Refractive Laser Beam Reshaper," In Laser Beam Shaping IV, vol. 5175, pp. 1-12. International Society for Optics and Photonics, Nov. 2003.

Laskin, A., "Achromatic Refractive Beam Shaping Optics for Broad Spectrum Laser Applications," In Laser Beam Shaping X, vol. 7430, p. 743003. International Society for Optics and Photonics, Aug. 2009.

Laskin, A., and David Shealy, "Building Achromatic Refractive Beam Shapers," In Laser Beam Shaping XV, vol. 9194, p. 91940R. International Society for Optics and Photonics, Sep. 2014.

Laskin, A., and Vadim Laskin, "Beam Shaping to Provide Round and Square-Shaped Beams in Optical Systems of High-Power Lasers," In Laser Technology for Defense and Security XII, vol. 9834, p. 98340B. International Society for Optics and Photonics, May 2016.

* cited by examiner

APPARATUS FOR BEAM SHAPING OF LASER RADIATION

CROSS REFERENCE TO RELATED APPLICATIONS

This application claims foreign priority under 35 U.S.C. § 119(a)-(d) to Application No. DE 102017115805.7 filed on Jul. 13, 2017, the entire contents of which are hereby incorporated by reference.

TECHNICAL FIELD

The present invention relates to an apparatus for beam shaping of laser radiation, in particular, for beam shaping of laser radiation in the form of ultra short pulses.

BACKGROUND

Definitions: Propagation direction of laser radiation refers to an average propagation direction of the laser radiation, in particular, when the laser radiation is not a plane wave or is at least partially divergent. Unless expressly stated otherwise, laser beam, light beam, partial beam or beam does not refer to an idealized beam of the geometrical optics, but rather to a real light beam, such as, for example, a laser beam with a Gaussian profile or a modified Gaussian profile, which does not have an infinitesimally small beam cross section, but rather an extended beam cross section. Top-hat distribution or top-hat intensity distribution or top-hat profile refers to an intensity distribution that can be described in essence at least with respect to one direction by a rectangular function (rect(x)). In this case, real intensity distributions, which exhibit deviations from a rectangular function in the range of percentages or which exhibit sloped edges, are also referred to as a top-hat distribution or top-hat profile.

An apparatus for beam shaping of laser radiation in the form of ultra short pulses is known, for example, from the document US 2010/0208356 A1. The apparatus described in this document comprises a plurality of laser light sources that emit laser radiations having wavelengths that differ from one another and a multiplexer that combines the various laser radiations into one polychromatic laser radiation. Furthermore, the apparatus comprises a Powell lens through which the polychromatic laser radiation passes, whereby the profile of the laser radiation is transformed at least partially into a top-hat profile. In this case, focal shifts occur on account of the different wavelengths. Furthermore, the apparatus comprises focusing optics that are spaced apart from the Powell lens and that consist of two achromatic lenses. The focusing optics, consisting of the achromatic lenses, correct the focal shifts produced by the different wavelengths of the individual components of the laser radiation.

The apparatus, described in this document is comparatively complex in design and requires that the system be accurately adjusted specifically for the selected wavelengths of the individual laser radiations that are mixed together. If other wavelengths are to be used, then the system has to be re-optimized.

In particular, in the case of ultra short laser pulses having pulse lengths of, for example, less than 100 fs, the laser radiation exhibits a bandwidth that may be a few tens of nanometers or even several hundreds of nanometers in size. Such laser pulses cannot be effectively transformed into laser radiation having a top-hat profile with conventional apparatuses for beam shaping.

The problem on which the present invention is based is to provide an apparatus by which wide band laser radiation can be effectively transformed into laser radiation with a top-hat profile and/or is simpler in design.

SUMMARY

An apparatus is described in which an optically functional transformation boundary surface is formed on one of two substrates. The result is a very compact design, because the optically functional transformation boundary surface is integrated into an achromatic optical device. Both together form one component, in particular, a monolithic component. Consequently an adjustment between the optically functional transformation boundary surface and the achromatic optical device or, more specifically, between the transformation boundary surface and the substrates of the achromatic optical device is not necessary.

In this case, the optically functional transformation boundary surface may be designed, in particular, as an entry surface or as an emergence surface of one of the substrates. In this way, the transformation boundary surface is integrated into one of the substrates in a simple way.

It may be provided that the optically functional transformation boundary surface has a shape that can cause the laser radiation to be transformed from a Gaussian profile or a modified Gaussian profile into a top-hat profile. As a result, the apparatus can be used in current laser apparatuses.

There is the possibility that the optically functional transformation boundary surface exhibits a shape that can cause a transformation into a top-hat profile for at least a first wavelength and at least a second wavelength that is different from the first wavelength, in particular, wherein the first wavelength differs from the second wavelength by more than 50 nm, preferably by more than 100 nm, for example, by more than 200 nm. For example, the shape of the transformation boundary surface may be selected such that a transformation into a top-hat profile is made possible for laser radiation having a wavelength of 1,064 nm and for laser radiation having a wavelength of 532 nm.

In particular, it can be provided that the optically functional transformation boundary surface has a shape that can cause a transformation into a top-hat profile for a wavelength range, in particular, wherein the wavelength range is more than 50 nm, preferably more than 100 nm, for example, more than 200 nm in size. As a result, even a laser radiation in the form of ultra short pulses, which have a large bandwidth of, for example, 100 nm, can be transformed into laser radiation with a top-hat profile.

There is the possibility that the shape of the optically functional transformation boundary surface is optimized for the at least one first wavelength and the at least one second wavelength with respect to the transformation to be carried out. As a result, a good transformation into a top-hat profile is made possible for wavelengths that are between these two wavelengths.

There is certainly the possibility that the shape of the transformation boundary surface is optimized for three or more different wavelengths.

It may be provided that the optimization of the shape of the optically functional transformation boundary surface is achieved by minimizing the following functional:

$$R = \int \left| \Im[(2/\sqrt{\pi})^{1/2} e^{-x^2} e^{i\varphi_{\lambda_1}(x,y)}] - (1/\alpha)^{1/2} rect(f/\alpha) \right|^2 df +$$

-continued $$\int |\mathfrak{F}[(2/\sqrt{\pi})^{1/2}e^{-x^2}e^{i\varphi_{\lambda_2}(x,y)}] - (1/\alpha)^{1/2}rect(f/\alpha)|^2 df,$$

where
$\mathfrak{F}$: Fourier transformation
α: spatial scaling factor,
f: frequency variable of the Fourier space,
$\lambda_1$: first wavelength,
$\lambda_2$: second wavelength,
$\varphi_\lambda 1$ and $\varphi_\lambda 2$: phase distributions and
x, y: coordinates of a coordinate system.

An effective transformation of laser radiation with different wavelengths into laser radiation in a top-hat profile can be achieved with such an optimization.

It can be provided that the first and/or the second substrate has/have curved boundary surfaces acting as lenses, wherein, in particular, at least one curved surface or individual ones of the curved surfaces is/are curved aspherically. In this context, each of the two substrates may have mutually corresponding, curved surfaces on their sides facing one another, wherein the mutually facing surfaces abut one another. The mutually abutting surfaces may be permanently connected to one another.

There is the possibility that the first substrate is made of crown glass or that the first substrate comprises crown glass. Furthermore, there is the possibility that the second substrate is made of flint glass or that the second substrate comprises flint glass. The selection of these materials makes it possible to achieve largely dispersion-free achromatic optical device.

Preferably the first Abbe number is, in particular, greater than 50, and/or the second Abbe number is less than 50. In this case the refractive index of the first substrate may be, in particular, less than 1.6, preferably between 1.5 and 1.6. Furthermore, the refractive index of the second substrate may be greater than 1.6, preferably between 1.6 and 2.0.

It may be provided that the apparatus is suitable for beam shaping of laser radiation in the form of pulses that exhibit a pulse length of less than 500 fs, preferably less than 200 fs, in particular, less than 100 fs.

BRIEF DESCRIPTION OF THE DRAWINGS

Other features and advantages of the present invention will become apparent from the following description of preferred exemplary embodiments with reference to the accompanying drawings.

Identical or functionally identical parts are provided with the same reference numerals in the figures.

DETAILED DESCRIPTION

Figure 1:
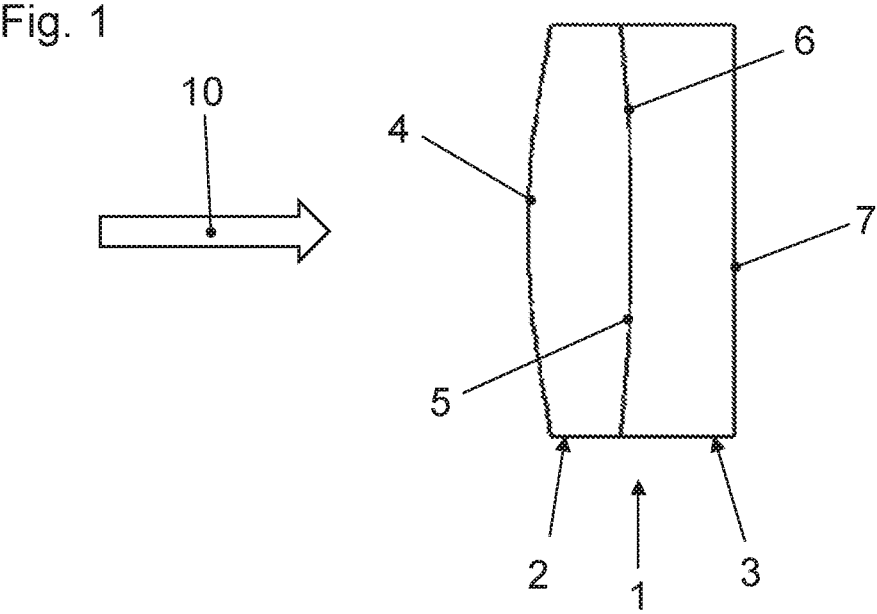
FIG. 1 is a side view in schematic form of an embodiment of an apparatus of the invention.

FIG. 1 shows an embodiment of an apparatus of the invention that comprises an achromatic optical device 1, which comprise a first substrate 2 and a second substrate 3.

Furthermore, the apparatus comprises a transformation boundary surface 4 that is a part of the first substrate 1 and serves as the entry surface thereof. The optically functional transformation boundary surface 4 has a shape that can cause a laser radiation 10 passing through the optically functional transformation boundary surface (see FIG. 1) to be transformed from a Gaussian profile or a modified Gaussian profile into a top-hat profile.

The first substrate 2 is made of crown glass and has an Abbe number greater than 50. The refractive index of the first substrate 2 may be between 1.5 and 1.6. The second substrate 3 is made of flint glass and has an Abbe number less than 50. The refractive index of the second substrate 3 may be between 1.6 and 2.0.

The entry surface of the first substrate 1 is formed so as to be convex and may be curved aspherically, with the entry surface serving as the transformation boundary surface 4. The emergence surface 5 of the first substrate 2 is also convex and may be curved spherically, with the emergence surface being opposite the entry surface. As an alternative, there is the possibility that the emergence surface 5 is also curved aspherically.

The entry surface 6 of the second substrate 3 is concave and may be curved spherically, with the entry surface facing the first substrate 2. As an alternative, there is the possibility that the entry surface 6 is also curved aspherically. The emergence surface 7 of the second substrate 3 is planar, with the emergence surface 7 being opposite the entry surface 6.

In particular, the shape of the entry surface 6 of the second substrate 3 matches comparatively exactly the shape of the emergence surface 5 of the first substrate 2, so that these surfaces may abut one another in a precisely fitting manner. The mutually abutting surfaces are permanently connected to one another, for example, by adhesively bonding.

There is certainly the possibility of switching the order of sequence of the substrates 1, 2, so that a substrate made of flint glass is provided on the left in FIG. 1; and a substrate made of crown glass is provided on the right in FIG. 1.

Furthermore, there is the possibility that the transformation boundary surface is integrated into one of the other surfaces. Thus, for example, the emergence surface 7 of the second substrate 3 may be shaped such that it serves as the transformation boundary surface. There is also the possibility that the emergence surface 5 of the first substrate 2 and/or the entry surface 6 of the second substrate 3 is/are designed as the transformation boundary surface.

In the illustrated exemplary embodiment, the shape of the transformation boundary surface 4 is optimized for two different wavelengths, i.e., for a first wavelength $\lambda_1=1,063$ nm and for a second wavelength $\lambda_2=532$ nm. There is certainly the possibility that the shape of the transformation boundary surface 4 is optimized for three or more different wavelengths.

Figure 2:
FIG. 2 is an intensity distribution of a laser radiation that was transformed with an apparatus of the invention and that has a wavelength of 1,064 nm.

FIG. 2 shows in schematic form an intensity distribution 8 of a laser radiation 10, which has passed through the apparatus from left to right according to FIG. 1 and which has a wavelength of 1,064 nm. In this case the intensity distribution may be, for example, a far field distribution or may be focused into a working plane by a corresponding focusing optics. It has been found that the laser radiation has a top-hat profile.

Figure 3:
FIG. 3 is an intensity distribution of a laser radiation that was transformed with an apparatus of the invention and that has a wavelength of 532 nm.

FIG. 3 shows in schematic form an intensity distribution 9 of a laser radiation 10, which has passed through the apparatus from left to right according to FIG. 1 and which has a wavelength of 532 nm. It has been found that the laser radiation also has a top-hat profile.

The transformation boundary surface 4 is shaped such that a transformation into a top-hat profile takes place not only for the two wavelengths 532 nm and 1,064 nm, but that a corresponding transformation into a top-hat profile also takes place for laser radiations with wavelengths ranging in-between. Thus, the apparatus is suitable for the transformation of wide band ultra short laser pulses.

Mathematically, the task of optimizing the transformation boundary surface 4 for two different wavelengths $\lambda_1$ and $\lambda_2$ can be solved in an iterative process by minimizing the functional R, reproduced below—here in a non-dimensional representation.

$$R = \int \left| \Im[(2/\sqrt{\pi})^{1/2} e^{-x^2} e^{i\varphi_{\lambda_1}(x,y)}] - (1/\alpha)^{1/2} rect(f/\alpha) \right|^2 df +$$
$$\int \left| \Im[(2/\sqrt{\pi})^{1/2} e^{-x^2} e^{i\varphi_{\lambda_2}(x,y)}] - (1/\alpha)^{1/2} rect(f/\alpha) \right|^2 df$$

where
$\Im$: Fourier transformation
$\alpha$: spatial scaling factor,
f: frequency variable of the Fourier space,
$\lambda 1$: first wavelength,
$\lambda 2$: second wavelength,
$\varphi\lambda 1$ and $\varphi\lambda 2$: phase distributions and
x, y: coordinates of a coordinate system.

The minimization of the functional R results in the desired phase distributions $\varphi_\lambda 1$ and $\varphi_\lambda 2$, on the basis of which the shape of the transformation boundary surface is defined.

Within the functional, the term $(2/\sqrt{\pi})^{1/2} e^{-x^2}$ represents the Gaussian intensity distribution of the input beam, to which a phase factor $e^{i\varphi}$ is multiplied up.

In order to convert the phase modulation, impressed on the Gaussian beam, into the desired distribution of the output intensity, it is necessary for this term to undergo a Fourier transformation $\Im$ that is achieved, in practice, by a field generating Fourier transformation lens—also referred to as field lens for short.

The term of the shape $(1/\alpha)^{1/2}$ rect $(f/\alpha)$ corresponds to a representation of the top-hat-shaped target intensity distribution.

The factor $\alpha$ is a parameter that determines the spatial dimension of the target field. By subtracting the terms of the transformed input intensity distribution from the target intensity distribution, the desired functionality of the transformation boundary surface is now ensured while minimizing the functional R.

What is claimed is:

1. An apparatus for beam shaping of laser radiation in the form of ultra short pulses, the apparatus comprising:
an optically functional transformation boundary surface that allows the laser radiation to pass at least partially, such that a profile of the laser radiation is transformed into a top-hat profile;
an achromatic optical device comprising a first substrate having a first Abbe number and a second substrate connected to the first substrate and having a second Abbe number that is different from the first Abbe number, the first and second substrates being arranged to allow the laser radiation to at least partially pass through the first and second substrates in succession, wherein the optically functional transformation boundary surface is disposed on one of each of the first and second substrates, such that the optically functional transformation boundary surface and the achromatic optical device together comprise a monolithic component.

2. The apparatus of claim 1, wherein the optically functional transformation boundary surface is an entry surface or as an emergence surface of one of the first and second substrates.

3. The apparatus of claim 1, wherein the optically functional transformation boundary surface is shaped to cause a transformation in the laser radiation from a Gaussian profile or a modified Gaussian profile into the top-hat profile.

4. The apparatus of claim 1, wherein the optically functional transformation boundary surface is shaped to cause a transformation into the top-hat profile for at least a first wavelength ($\lambda_1$) and at least a second wavelength ($\lambda_2$) that is different from the first wavelength ($\lambda_1$) by more than 50 nm.

5. The apparatus of claim 4, wherein a shape of the optically functional transformation boundary surface is optimized for the first wavelength ($\lambda_1$) and for the second wavelength ($\lambda_2$) with respect to the transformation to be carried out.

6. The apparatus of claim 5, wherein optimization of the shape of the optically functional transformation boundary surface is achieved by minimizing the following function:

$$R = \int \left| \Im[(2/\sqrt{\pi})^{1/2} e^{-x^2} e^{i\varphi_{\lambda_1}(x,y)}] - (1/\alpha)^{1/2} rect(f/\alpha) \right|^2 df +$$
$$\int \left| \Im[(2/\sqrt{\pi})^{1/2} e^{-x^2} e^{i\varphi_{\lambda_2}(x,y)}] - (1/\alpha)^{1/2} rect(f/\alpha) \right|^2 df$$

where
$\Im$: Fourier transformation
$\alpha$: spatial scaling factor,
f: frequency variable of the Fourier space,
$\lambda_1$: first wavelength,
$\lambda_2$: second wavelength,
$\varphi\lambda_1$ and $\varphi\lambda_2$: phase distributions and
x, y: coordinates of a coordinate system.

7. The apparatus of claim 1, wherein the optically functional transformation boundary surface is shaped to cause a transformation into the top-hat profile for at least a first wavelength ($\lambda_1$) and at least a second wavelength ($\lambda_2$) that is different from the first wavelength ($\lambda_1$) by more than 100 nm.

8. The apparatus of claim 1, wherein the optically functional transformation boundary surface is shaped to cause a transformation into the top-hat profile for at least a first wavelength ($\lambda_1$) and at least a second wavelength ($\lambda_2$) that is different from the first wavelength ($\lambda_1$) by more than 200 nm.

9. The apparatus of claim 1, wherein the optically functional transformation boundary surface is shaped to cause a transformation into the top-hat profile for a wavelength range of more than 50 nm in size.

10. The apparatus of claim 1, wherein the optically functional transformation boundary surface is shaped to cause a transformation into the top-hat profile for a wavelength range of more than 100 nm in size.

11. The apparatus of claim 1, wherein the optically functional transformation boundary surface is shaped to cause a transformation into the top-hat profile for a wavelength range of more than 200 nm in size.

12. The apparatus of claim 1, wherein at least one of the first and second substrates has at least one boundary surface that is curved aspherically.

13. The apparatus of claim 12, wherein the first and second substrates have mutually corresponding, curved surfaces on their sides facing one another, wherein the mutually corresponding, curved surfaces abut one another.

14. The apparatus of claim 1, wherein the first substrate comprises crown glass.

15. The apparatus of claim 1, wherein the second substrate comprises flint glass.

16. The apparatus of claim 1, wherein the first Abbe number is greater than 50 and the second Abbe number is less than 50.

17. The apparatus of claim 1, wherein the refractive index of the first substrate is less than 1.6.

18. The apparatus of claim 1, wherein the refractive index of the second substrate is greater than 1.6.

19. The apparatus of claim 1, wherein the apparatus is suitable for beam shaping of laser radiation in the form of pulses having a pulse length of less than 500 fs.

20. The apparatus of claim 1, wherein the first and second substrates have mutually corresponding curved surfaces on their sides facing one another, and wherein the mutually corresponding curved surfaces abut, and are permanently connected to, one another.

\* \* \* \* \*